(12) United States Patent
Boulton

(10) Patent No.: US 8,452,111 B2
(45) Date of Patent: May 28, 2013

(54) REAL-TIME COMPRESSION AND DECOMPRESSION OF WAVELET-COMPRESSED IMAGES

(75) Inventor: Michael Boulton, Twycross (GB)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 12/133,391

(22) Filed: Jun. 5, 2008

(65) Prior Publication Data

US 2009/0304291 A1    Dec. 10, 2009

(51) Int. Cl.
*G06K 9/46* (2006.01)
(52) U.S. Cl.
USPC .......................................................... 382/240
(58) Field of Classification Search
USPC .......................................................... 382/240
See application file for complete search history.

(56) References Cited

U.S. PATENT DOCUMENTS

| | | | |
|---|---|---|---|
| 5,546,477 A | | 8/1996 | Knowles et al. |
| 5,831,625 A | * | 11/1998 | Rich et al. .................... 345/587 |
| 6,266,817 B1 | | 7/2001 | Chaddha |
| 6,272,180 B1 | | 8/2001 | Lei |
| 6,339,658 B1 | * | 1/2002 | Moccagatta et al. .......... 382/240 |
| 6,353,634 B1 | | 3/2002 | Houlberg |
| 6,469,701 B1 | | 10/2002 | Gumhold |
| 6,483,946 B1 | | 11/2002 | Martucci et al. |
| 6,496,601 B1 | | 12/2002 | Migdal et al. |
| 7,016,417 B1 | | 3/2006 | Roman et al. |
| 7,050,642 B2 | | 5/2006 | Graffagnino |
| 7,076,104 B1 | | 7/2006 | Keith et al. |
| 7,233,619 B1 | | 6/2007 | Roman |
| 2001/0024530 A1 | * | 9/2001 | Fukuhara et al. ............. 382/240 |
| 2005/0259880 A1 | * | 11/2005 | Fukuhara et al. ............. 382/240 |
| 2005/0265617 A1 | * | 12/2005 | Fukuhara et al. ............. 382/240 |
| 2007/0174280 A1 | * | 7/2007 | Kim et al. ........................ 707/7 |
| 2008/0049041 A1 | * | 2/2008 | Kobayashi et al. ........... 345/587 |

FOREIGN PATENT DOCUMENTS

WO        03001748 A1    1/2003

OTHER PUBLICATIONS

Guthe, et al. "Real-Time Decompression and Visualization of Animated Volume Data", Proceedings of the Conference on Visualization '01, Date 2001. IEEE Computer Society Washington, DC, USA. pp. 349-356.
Stachera, et al. "GPU-Based Hierarchical Texture Decompression", EUROGRAPHICS 2006, 4 Pages.
Diverdi, et al., "Real-time Rendering with Wavelet-Compressed Multi-Dimensional Datasets on the GPU", Technical Report UCSB// CSD-05-05, University of California at Santa Barbara, 2005. 8 Pages.

* cited by examiner

*Primary Examiner* — Jingge Wu
(74) *Attorney, Agent, or Firm* — Mayer & Williams PC

(57) ABSTRACT

Arrangements are provided for real-time variable compression and decompression schemes. In one arrangement, compressed images are stored as collections of tiled line textures representing breadth-first trees. In another arrangement, an image is decompressed directly on a GPU employing a microcode pixel shader. The arrangements allow for variable compression that can take into account complex local variations in light and shadowing. In this way, areas of high contrast may have significant detail preserved. The arrangement may be employed in a number of applications, including real-time shader image decompression, lighting and relighting, static shadow maps, dynamic texture packing, geometric representations, displacement maps, and so on.

7 Claims, 4 Drawing Sheets

REAL-TIME COMPRESSION AND DECOMPRESSION OF WAVELET-COMPRESSED IMAGES

BACKGROUND

Image compression schemes reduce the amount of data used to represent a given quantity of information. Preferably, this reduction is based on redundant data in the image, and deleterious effects on the image are minimized.

For example, S3 texture compression (also known as DXTn or DXTC) refers to a group of fixed-rate image compression algorithms which are well-suited for compressing textures in hardware-accelerated 3D computer graphics. In one type of DXT compression, images are divided into 4×4 pixel blocks, or "texels". For each texel, two color values are chosen to represent the range of pixel colors within that block, and each pixel is mapped to one of four possible colors (two bits) within that range. The compressed texel is represented by the two 16-bit color values, and 16 2-bit pixel values, totaling 64 bits of data per texel, amounting to an overall image size of 4 bits per pixel. However, such compression varieties are not dependent on the image compressed, and thus compress all portions of the image without regard to local variations, i.e., details, in the image.

Some attempts have been made to ameliorate the situation. For example, DiVerdi, Candussi, and Höllerer of the University of California, Santa Barbara, have presented a method for using large, high dimension and high dynamic range datasets on modern graphics hardware, including processing datasets with a discrete wavelet transform and storing the same in a 2D texture memory.

SUMMARY

Arrangements described below provide for real-time variable compression and decompression schemes. In one arrangement, compressed images are stored as collections of tiled line textures representing breadth-first trees. The image is decompressed directly on a GPU employing a microcode pixel shader. As an example, using these arrangements, decompression rates have been achieved in excess of 500 fps for full per-pixel 720p decompression of monochrome images on the Xbox360® game console available from Microsoft Corporation in Redmond, Wash.

The arrangements allow for variable compression that can take into account complicated images with complex local variations in light and shadowing. For example, the arrangement can provide deeper compression in areas of discontinuities, where high-frequency terms are important. In this way, areas of high contrast may have significant detail preserved, and in some cases may even be made lossless, and areas of lower contrast may be smoothed. Such lossless compression may be particularly relevant for "data" textures, such as those employing spherical harmonic (SH) coefficients.

The arrangement may be employed in a number of applications, including real-time shader image decompression, lighting and relighting, static shadow maps, dynamic texture packing, geometric representations, and numerous others. The arrangement may also be applied to displacement maps over large areas. For example, compression may be accomplished of very large displacement maps, which may facilitate large areas of geography, e.g., maps or terrains, being stored as a single displacement map in an efficiently compressed manner.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

The below description provides an arrangement for employing wavelets to accomplish real-time variable compression and decompression. Wavelets are mathematical functions formed from scaled and translated copies of a few basis functions, and have advantages over certain other techniques, e.g., Fourier transforms and spherical harmonics. For example, wavelets are able to localize functions in both frequency and space. So while spherical harmonics have many features inherent as well, e.g., spherical invariance, for certain items, e.g., glossy environments, wavelets are more advantageous. Similarly, Fourier transforms only provide frequency information, and a "point basis" only provides spatial information. The local coverage of wavelet bases also allows windowed changes, e.g., employing only local bases, as opposed to the global coverage of spherical harmonics. In addition, MIP map chains are not required for image decompression.

Figure 1:
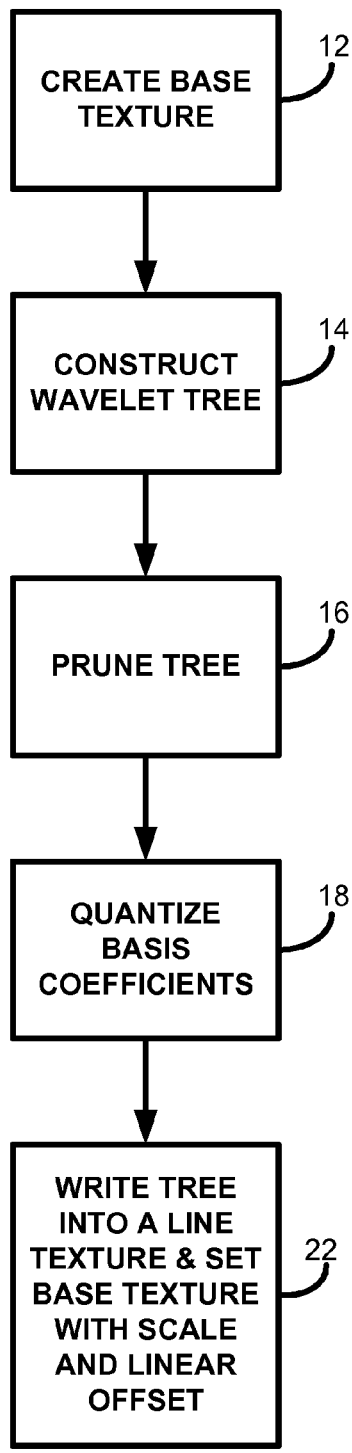
FIG. 1 is a flowchart illustrating a method for compression.
Figure 2:
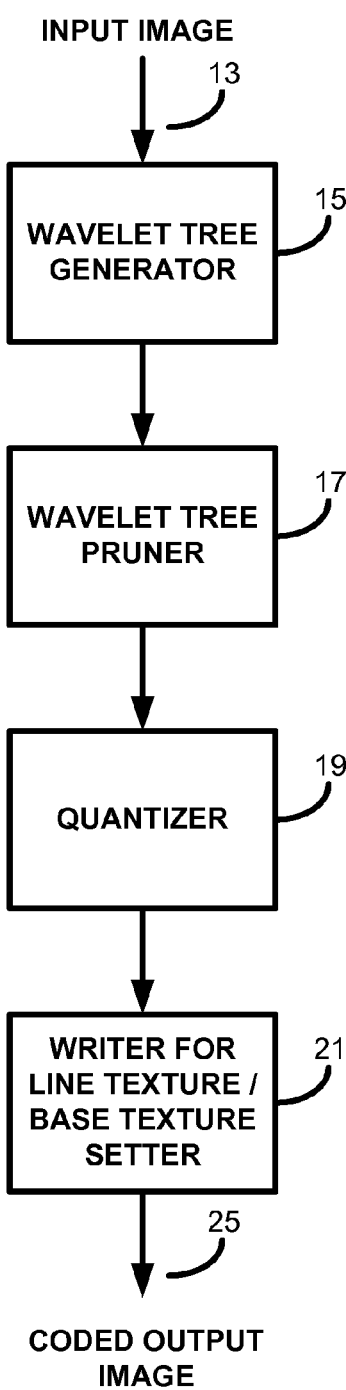
FIG. 2 is a simplified schematic diagram of a compression arrangement.

A method and arrangement for real-time variable compression are illustrated in FIGS. 1 and 2, respectively. Referring first to FIG. 1, a first step of the method is the creation of a base texture (step 12) from an initial texture. For purposes of this description, the initial texture, or initial image, is assumed to be a rectangular texture with width and height both divisible by sixteen. However, it is clear that any initial texture or image may be employed, with suitable variations in the parameters of the method. Certain variations are discussed below.

Figure 3:
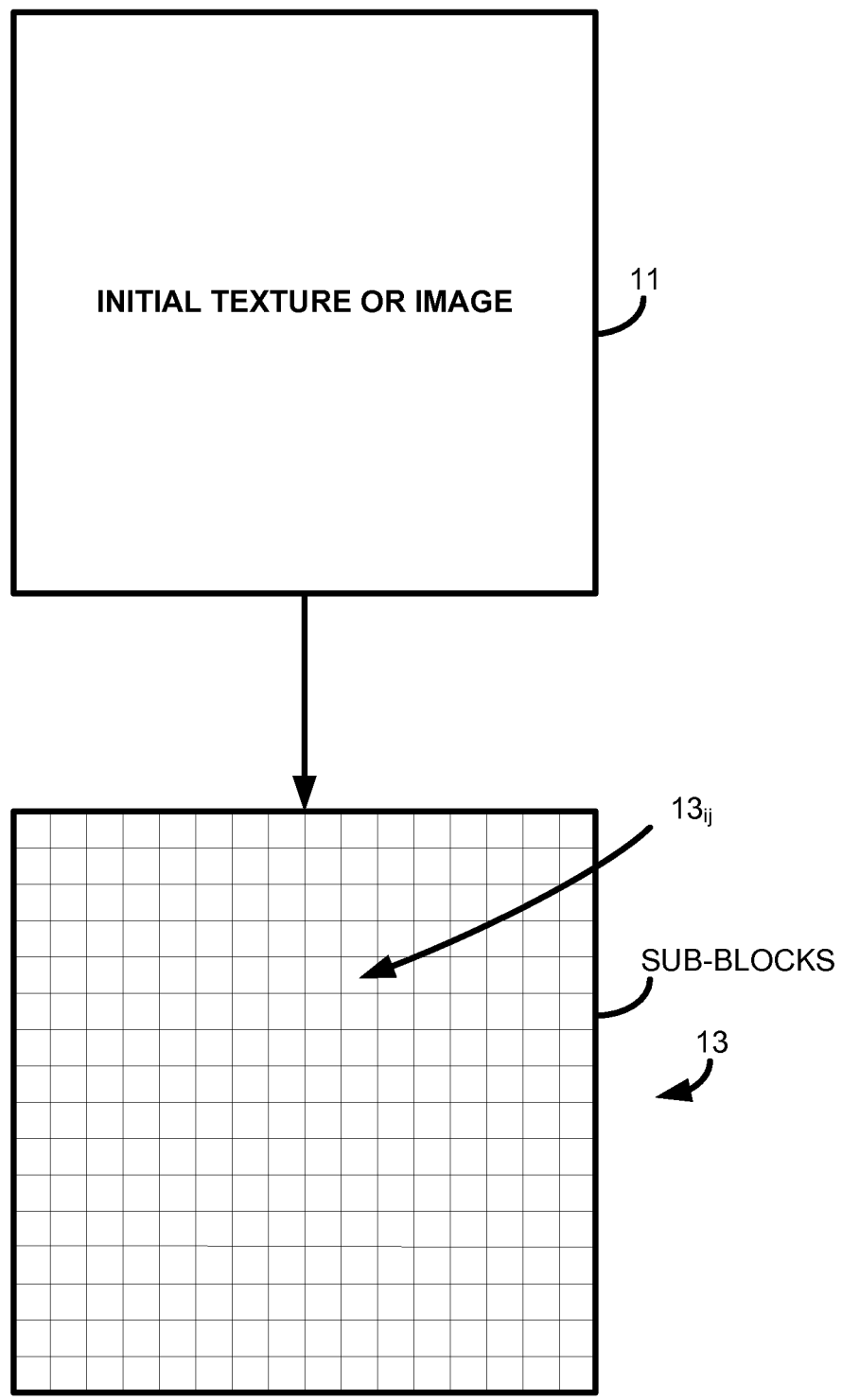
FIG. 3 illustrates a transformation of an image from an initial texture to a base texture or array of texel sub-blocks.

The initial texture is resolved into the base texture, which is composed of a number of sub-blocks. For example, an initial monochrome texture may be broken up into 16×16 texel blocks. In this case, the base texture is a rectangular texture with resolution one-sixteenth of the initial texture in both dimensions. Each texel is thus 1/256 of the initial image. FIG. 3 indicates the transformation from an initial texture 11 to a base texture 13 composed of an 16×16 array of sub-blocks $13_{ij}$.

The above example discloses an initial texture that may have a width and height both divisible by N, and the base texture may then be a rectangular texture with resolution 1/N in both directions. There is no requirement, however, that the resolution be the same in each direction.

Each block is then compressed into a wavelet sub-tree. For example, for each of the N×N sub-blocks above, a lossless 2D Haar wavelet tree is constructed (step 14) by a wavelet tree generator 15 (see FIG. 2). This wavelet tree may be constructed using any suitable technique, including hierarchical subband decompositions, which include both standard and nonstandard wavelet transforms. Each sub-tree generally fits inside a texture cache tile without overflow. While overflow may occur, it is unlikely due to the size of the sub-blocks.

There are many types of wavelet bases, and the use of a 2D Haar tree is exemplary, although the same has certain advantages for current graphical processing units (GPUs), including that employed in the Xbox360® game console, available from Microsoft® Corporation of Redmond, Wash. For example, 2D Haar trees are particularly useful in working with single points of data. They are also the simplest basis set, and while sometimes resulting in some block-like artifacts, as well as requiring more basis terms, they are convenient to implement. In addition, block-like artifacts tend to decrease once integration is performed, which smooths the reconstructed details. However, other basis functions may also be employed.

The hierarchical subband decompositions result in a hierarchical multi-scale representation of each of the sub-blocks. In other words, the decompositions result in the coding of a binary map or wavelet tree indicating the locations of the non-zero values, i.e., a significance map, of the transform coefficients. Each element in the base texture stores a scaling coefficient and an offset to the start of the sub-tree. Every coefficient at a given scale may be related to a set of coefficients at a next finer scale of similar orientation according to the wavelet tree. The coarsest scale coefficients are termed the parent nodes, and all coefficients of the same location at the next finer scale are termed child nodes.

The constructed 2D Haar wavelet tree is then pruned (step 16) by a wavelet tree pruner 17. Various types of pruners and pruning methods may be employed. For example, the routine may ignore a node or set of nodes (such as a node branch) because the nodes have a zero value or a value below a predetermined threshold.

The basis coefficients may then be quantized (step 18), such that they take on set or discrete values. This quantization is performed by a quantizer module 19, and can further help to compress the image by reducing the space used for storage and transmission. Various types of quantizers may be employed. In one exemplary arrangement, the coefficients are first windowed and then quantized to 8 bits per basis term. Other arrangements are also possible.

The pruning and quantization removes localized frequencies but only affects the final image in a minor way, resulting in a final image very close to the original data, with low occurrence of error.

Each pruned and quantized wavelet tree is then written breadth-first into a line texture (step 22) using line texture writer 21. Multiple ways may be employed to pack the data, e.g., ARGB8, in which case (r,g,b) stores the windowed wavelet basis coefficients and (a) stores the linear offset to the child of a node, if one exists. Other data formats may also be employed, e.g., U16, F32, and the like.

The line texture stores the trees for each 16×16 sub-block sequentially. The use of a line texture accords certain benefits in some arrangements. For example, good texture cache performance is obtained during traversal, as an entire 16×16 sub-block can fit into a single texture file. Relatedly, decompression time and performance is independent of image resolution. Moreover, additional performance is gained by unrolling the traversal loop in the pixel shader as described below. The above allows the arrangement to balance ALU and texture operations effectively, providing a performance advantage.

Information about a given stored wavelet tree includes the offset into the line texture at which the given tree begins, as well as the base scale of the tree. This information may be stored in the base texture, at the texel associated with the 16×16 sub-block.

Each element of the line texture includes the three wavelet basis coefficients (characteristic of a 2D wavelet transform), together with the linear offset from the current node to its first child node, if one exists. Otherwise it points to the beginning of the line texture, where a null element has been stored. This improves texture cache performance when a particular pixel has finished its traversal, but other pixels within the same vector have not.

The above describes variable compression in real time of images and storage of the same as collections of tiled line textures representing breadth-first trees. The below description details decompression of such images. In particular, a microcode pixel shader is employed to decompress the wavelet image in real time. In this way, no "scratch" memory is needed for intermediate decompression, as the image remains in compressed form. All decompression is performed directly in the pixel shader.

Figure 4:
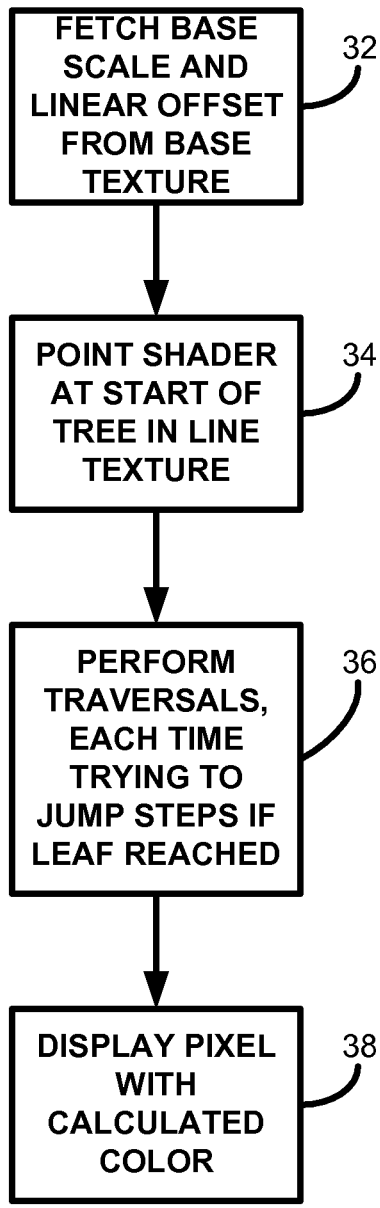
FIG. 4 is a flowchart illustrating a method for decompression.
Figure 5:
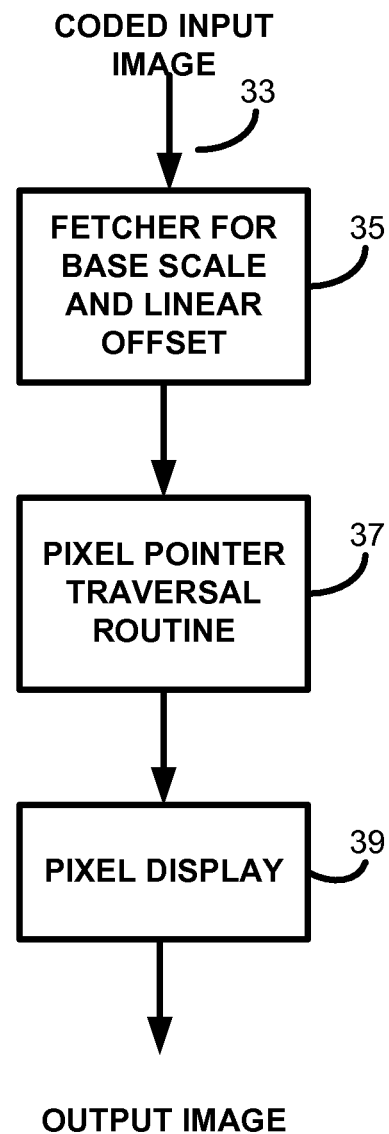
FIG. 5 is a simplified schematic diagram of a decompression arrangement.

Referring to FIGS. 4-5, for a given pixel to be rendered from a coded input image 33, the UV coordinate is used to fetch the base scale and linear offset (step 32) from the base texture as created above. This step may be performed by a fetcher module 35 or by any other type of fetching routine.

The linear offset obtained (from step 32) is then employed to point a pixel shader traversal routine 37 at the start of the wavelet tree associated with that N×N tile, e.g., 16×16 tile (step 34).

Given a UV coordinate, the pixel shader traverses the appropriate sub-tree for the final value. Nodes are scanned in the order of the scales of the decomposition, from coarsest level to finest. This means that no child node is scanned until after its parent and all other parents in all subbands at the same scale as that parent have been scanned. This is a type of modified breadth-first, subband by subband, traversal performed across all the wavelet trees defined by the coefficients of the wavelet transform of the two-dimensional data set.

In particular, the pixel shader then performs (step 36) up to four unrolled traversal steps, each time stepping up to a higher level of the tree. At each stage, the basis coefficients at the child jump offset are fetched. A value is added to the total based upon the quadrant of the current node in which the UV coordinate is located. In essence, if the current node has no child, e.g., because of early termination due to the pruning step in the compression algorithm, then the pixel shader may attempt to dynamically jump over the remaining traversal steps. When the process has completed, the final value represents the decompressed image value at the given UV coordinate. This value may then be displayed as the rendered pixel (step 38) on a display 39.

The method can be extended to multiple-channel compression, e.g., a color texture. In this case, three trees are stored for each channel. In an alternative arrangement, a tree may be stored that represents intensity, and three additional trees may represent red, green, and blue, these additional trees being stored at a reduced fidelity. Numerous other arrangements are possible.

A specific example is now described, in the context of relighting. In this example, a transfer function (with cosine) and the environment are represented as wavelet trees in a texture:

$$B(\bar{x}, \omega_0) = \int\int_\Omega L(\omega)V(\bar{x}, \omega)f\gamma(\bar{x}, \omega \to \omega_0)[\omega \cdot n(\bar{x})]d\omega$$

In this example, only the intersection of both trees need be traversed, and so if one tree is simple, good performance may be obtained. For traversal with parallel GPUs, knowledge is required of how to jump over parts of either tree that are not contained in the intersection. One way, if a node has a child, is to store a linear offset to a sibling or ancestor, which may even be the root. Then, the traversal may jump over the entire child branch if the other tree has no children at that point.

Thus, it can be seen that the arrangements described enable a convenient method and arrangement to compress and decompress wavelet-encoded images using variable compression in real-time.

Figure 6:
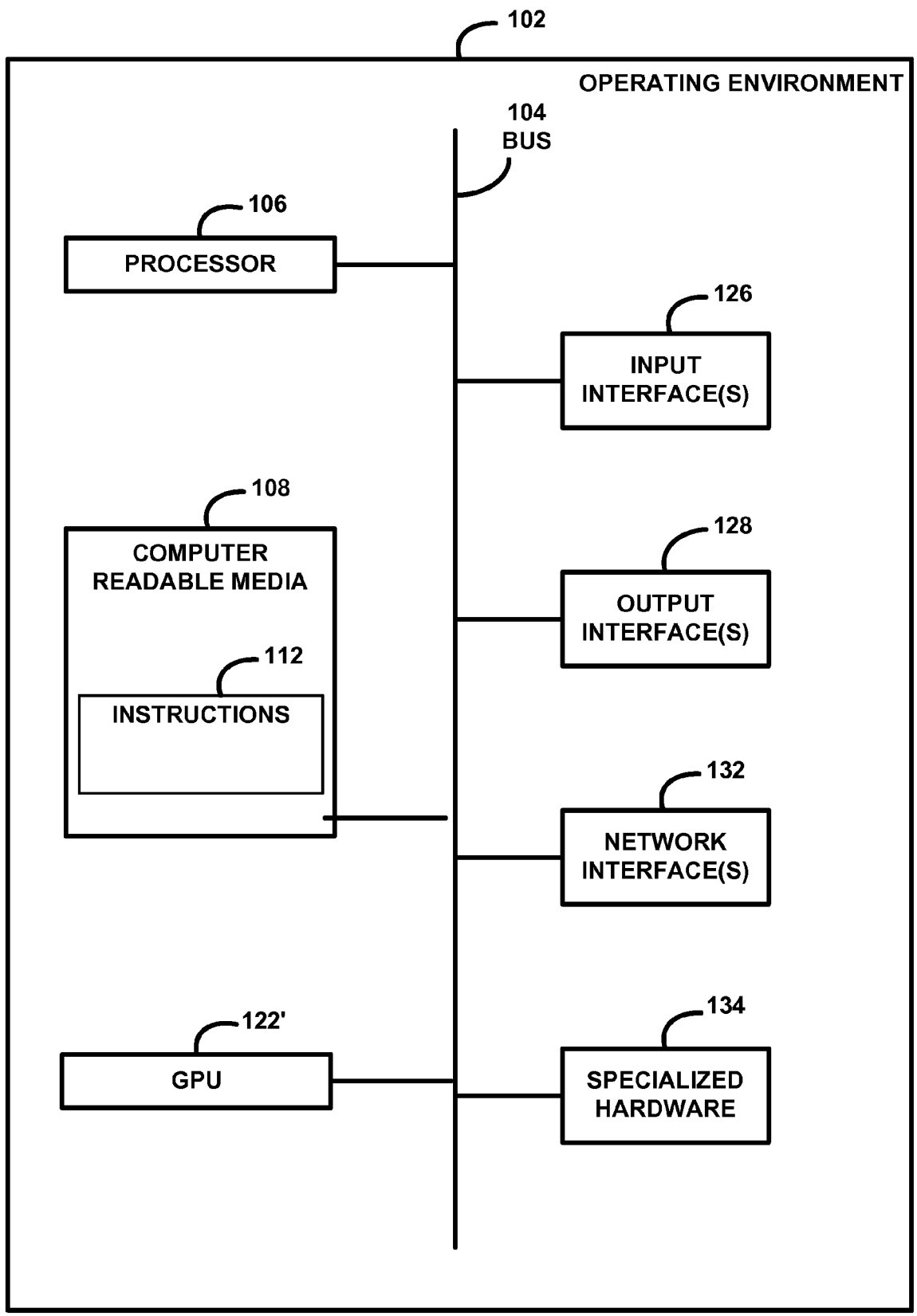
FIG. 6 is a simplified functional block diagram of an exemplary configuration of an operating environment in which the variable compression and decompression arrangements may be implemented or used.

FIG. 6 is a block diagram of an exemplary configuration of an operating environment 102 (such as a client-side device or application or a networked server or service) in which all or part of the methods shown and discussed in connection with the figures may be implemented or used. Operating environment 102 is generally indicative of a wide variety of general-purpose or special-purpose computing environments, and is not intended to suggest any limitation as to the scope of use or functionality of the arrangements described herein. For example, operating environment 102 may be that of any type of computer or game console.

As shown, operating environment 102 includes processor 106, computer-readable media 108, and computer-executable instructions 112. One or more internal buses 104 may be used to carry data, addresses, control signals, and other information within, to, or from operating environment 102 or elements thereof.

Processor 106, which may be a real or a virtual processor, controls functions of the operating environment by executing computer-executable instructions 112. The processor may execute instructions at the assembly, compiled, or machine-level to perform a particular process.

Computer-readable media 108 may represent any number and combination of local or remote devices, in any form, now known or later developed, capable of recording, storing, or transmitting computer-readable data, such as the above-noted computer-executable instructions 112 and including user interface functions 114. In particular, the computer-readable media 108 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal. Numerous other variations of the above will be apparent.

Computer-executable instructions 112 represent any signal processing methods or stored instructions. Generally, computer-executable instructions 112 are implemented as software components according to well-known practices for component-based software development, and encoded in computer-readable media. Computer programs may be combined or distributed in various ways. Computer-executable instructions 112, however, are not limited to implementation by any specific embodiments of computer programs, and in other instances may be implemented by, or executed in, hardware, software, firmware, or any combination thereof. That is, the arrangement need not be implemented in a computer program per-se, but may in fact be burned into firmware on single-purpose processors in CE-type devices.

Input interface(s) 126 are any now known or later developed physical or logical elements that facilitate receipt of input to operating environment 102.

Output interface(s) 128 are any now known or later developed physical or logical elements that facilitate provisioning of output from operating environment 102.

Network interface(s) 132 represent one or more physical or logical elements, such as connectivity devices or computer-executable instructions, which enable communication between operating environment 102 and external devices or services, via one or more protocols or techniques. Such communication may be, but is not necessarily, client-server type communication or peer-to-peer communication. Information received at a given network interface may traverse one or more layers of a communication protocol stack.

Specialized hardware 134 represents any hardware or firmware that implements functions of operating environment 102. Examples of specialized hardware include encoder/decoders decrypters, application-specific integrated circuits, clocks, and the like. A particular type of specialized hardware is the GPU 122', shown separately. The GPU 122' is a graphics rendering device that is particularly adept at manipulating and rendering graphical data.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

It is further noted that the arrangements and methods shown may also be situated and designed in a mobile or portable environment, such as ones employing lower power chipsets, distributed chipsets, and chips that are single-purpose, as opposed to general purpose processors.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive (or the like) to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A computer-readable medium not consisting of a propagated data signal, said computer readable storage medium being encoded with computer executable instructions which, when executed by a processor, perform a method of storing an image in a compressed format, the method comprising:
   a. creating a base texture from a rectangular initial texture, the base texture including a plurality of texel sub-blocks, the base texture having a resolution that is fractionally smaller than that of the initial texture in both width and height and including a plurality of elements, each element in the base texture storing a linear offset;
   b. for each texel sub-block, losslessly constructing a corresponding wavelet tree through hierarchical sub-band decomposition in which a hierarchical multi-scale representation of the texel-sub blocks is utilized so that parent nodes in the wavelet tree have a coarser scale compared with any child nodes in the wavelet tree, and each element in the base texture further storing a base scale applicable to the constructed wavelet tree;
   c. pruning each wavelet tree;
   d. quantizing each wavelet tree; and
   e. sequentially writing each wavelet tree breadth first into a single line texture, each linear offset pointing to a position of a corresponding wavelet tree within the line texture.

2. The computer-readable medium of claim 1, in which the initial texture is divisible by N in its height and by N in its width, and in which the creating includes creating N×N sub-blocks.

3. The computer-readable medium of claim 1, in which the constructing includes constructing a lossless 2D Haar wavelet tree.

4. The computer-readable medium of claim 1, in which the line texture is a tiled line texture.

5. The computer-readable medium of claim 1, in which the quantizing includes quantizing the coefficients to 8 bits per basis term.

6. The computer-readable medium of claim 1, in which the writing includes, for each wavelet tree, writing three wavelet basis coefficients and a linear offset.

7. The computer-readable medium of claim 1, in which the resolution of the base texture is one-sixteenth of the resolution of the initial texture in both width and height.

* * * * *